(12) United States Patent
Avis et al.

(10) Patent No.: US 12,201,966 B2
(45) Date of Patent: Jan. 21, 2025

(54) CATALYST FOR TREATING EXHAUST GAS

(71) Applicant: JOHNSON MATTHEY PUBLIC LIMITED COMPANY, London (GB)

(72) Inventors: Daniel Robert Avis, Royston (GB); Alexander Nicholas Michael Green, Royston (GB); Matthew Eben Harris, Royston (GB); Oliver Hemming, Billingham (GB); Loredana Mantarosie, Reading (GB); Alanna Susan Murphy, Royston (GB); Maria Pia Ruggeri, Reading (GB)

(73) Assignee: Johnson Matthey Public Limited Company, London (GB)

( * ) Notice: Subject to any disclaimer, the term of this patent is extended or adjusted under 35 U.S.C. 154(b) by 18 days.

(21) Appl. No.: 17/931,454

(22) Filed: Sep. 12, 2022

(65) Prior Publication Data

US 2023/0077564 A1 Mar. 16, 2023

Related U.S. Application Data

(60) Provisional application No. 63/261,180, filed on Sep. 14, 2021.

(51) Int. Cl.
| | |
|---|---|
| *B01J 23/10* | (2006.01) |
| *B01D 53/94* | (2006.01) |
| *B01J 23/72* | (2006.01) |
| *B01J 29/04* | (2006.01) |
| *B01J 37/30* | (2006.01) |

(52) U.S. Cl.
CPC .......... *B01J 23/72* (2013.01); *B01D 53/9418* (2013.01); *B01J 23/10* (2013.01); *B01J 29/044* (2013.01); *B01J 37/30* (2013.01); *B01D 2255/2065* (2013.01); *B01D 2255/20761* (2013.01); *B01D 2255/50* (2013.01); *B01D 2257/40* (2013.01); *B01D 2258/012* (2013.01); *B01J 2229/183* (2013.01); *B01J 2523/17* (2013.01); *B01J 2523/3712* (2013.01)

(58) Field of Classification Search
None
See application file for complete search history.

(56) References Cited

U.S. PATENT DOCUMENTS

2013/0195731 A1* 8/2013 Bull .................. B01J 29/76
422/171
2014/0328738 A1 11/2014 Chandler et al.

FOREIGN PATENT DOCUMENTS

| CN | 111135860 A | | 5/2020 |
|---|---|---|---|
| EP | 2659973 | * | 11/2013 |
| JP | 2018083725 | * | 5/2018 |
| KR | 20210014116 | * | 2/2021 |
| WO | 2012075400 | | 12/2011 |
| WO | 2013079954 A1 | | 6/2013 |

* cited by examiner

*Primary Examiner* — Sheng H Davis
(74) *Attorney, Agent, or Firm* — BakerHostetler

(57) ABSTRACT

Catalyst compositions and methods of preparation comprising: exchanging a rare earth element into a molecular sieve; incorporating a promoter metal into the molecular sieve; wherein the rare earth element exchanging step and the promoter metal incorporation step are performed as separate steps.

15 Claims, 3 Drawing Sheets

CATALYST FOR TREATING EXHAUST GAS

BACKGROUND

1. Field of Invention

The present invention relates to catalysts, articles, and methods for treating combustion exhaust gas, selective catalytic reduction (SCR) of $NO_x$ in lean-burn combustion exhaust gas.

2. Description of Related Art

The largest portions of most combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of these undesirable components, preferably by a process that, in turn, does not generate other noxious or toxic substances.

One of the most burdensome components to remove from a vehicular exhaust gas is $NO_x$, which includes nitric oxide (NO), nitrogen dioxide ($NO_2$), and nitrous oxide ($N_2O$). The reduction of $NO_x$ to $N_2$ in a lean burn exhaust gas, such as that created by diesel engines, is particularly problematic because the exhaust gas contains enough oxygen to favor oxidative reactions instead of reduction. $NO_x$ can be reduced in a diesel exhaust gas, however, by a process commonly known as Selective Catalytic Reduction (SCR). An SCR process involves the conversion of $NO_x$, in the presence of a catalyst and with the aid of a reducing agent, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

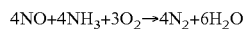

$$4NO+4NH_3+3O_2 \rightarrow 4N_2+6H_2O$$

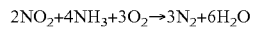

$$2NO_2+4NH_3+3O_2 \rightarrow 3N_2+6H_2O$$

$$NO+NO_2+2NH_3 \rightarrow 2N_2+3H_2O$$

Known SCR catalysts include zeolites and other molecular sieves. Molecular sieves are microporous crystalline solids with well-defined structures and generally contain silicon, aluminum and oxygen in their framework and can also contain cations within their pores. A defining feature of a molecular sieve is its crystalline or pseudo-crystalline structure which is formed by molecular tetrahedral cells interconnected in a regular and/or repeating manner to form a framework. Unique zeolite frameworks are commonly recognized by a three-letter code assigned by the International Zeolite Association (IZA) Structure Commission. Examples of molecular sieves frameworks that are known SCR catalysts include Framework Type Codes CHA (chabazite), BEA (beta), and MOR (mordenite).

Some molecular sieves have a three-dimensional molecular framework that arises from a series of interconnected cells. The cells of these molecular sieves typically have volumes on the order of a few cubic nanometers and cell openings (also referred to as "pores" or "apertures") on the order of a few angstroms in diameter. The cells can be defined by the ring size of their pores, where, for example, the term "8-ring" refers to a closed loop that is built from 8 tetrahedrally coordinated silicon (or aluminum) atoms and 8 oxygen atoms. In certain zeolites, the cell pores are aligned within the framework to create one or more channels which extend through the framework, thus creating a mechanism to restrict the ingress or passage of different molecular or ionic species through the molecular sieve, based on the relative sizes of the channels and molecular or ionic species. The size and shape of molecular sieves affect their catalytic activity in part because they exert a steric influence on the reactants, controlling the access of reactants and products. For example, small molecules, such as NOx, can typically pass into and out of the cells and/or can diffuse through the channels of a small-pore molecular sieve (i.e., those having framework with a maximum ring size of eight tetrahedral atoms), whereas larger molecules, such as long chain hydrocarbons, cannot. Moreover, partial or total dehydration of a molecular sieve can result in a crystal structure interlaced with channels of molecular dimensions.

The temperature of an exhaust gas exiting a mobile lean-burn engine, such as a diesel engine, is often 500 to 650° C. or higher. The exhaust gas typically contains water vapor as well. Therefore, hydrothermal stability is an important consideration in designing an SCR catalyst.

While zeolites per se often have catalytic properties, their catalytic performance may be improved in certain environments by a cationic exchange wherein a portion of ionic species existing on the surface or within the framework is replaced by transition metal cations, such $Cu^{2+}$. That is, a zeolite's SCR performance can be promoted by loosely holding one or more transition metal ions, such as copper or iron, to the molecular sieve's framework.

For transition metal exchanged SCR catalysts, it is desirable to have high catalytic activity at low operating temperatures. At operating temperatures below 400° C., higher metal loading results in higher catalytic activity. The achievable metal loading is often dependent on the quantity of exchange sites in the in the molecular sieve. In general, molecular sieves with low SAR allow for the highest metal loadings, thus leading to a conflict between the need for high catalytic activity and high hydrothermal stability which is achieved by a relatively higher SAR value. Moreover, high copper-loaded catalysts do not perform as well at high temperatures (e.g., >450° C.). For example, loading an aluminosilicate having a CHA framework with large amounts of copper (i.e., copper-to-aluminum atomic ratio of >0.25) can result in significant $NH_3$ oxidation at temperatures over 450° C., resulting in low selectivity to $N_2$. This shortcoming is particularly acute under filter regeneration conditions which involve exposing the catalyst to temperatures above 650° C.

Another important consideration in designing an SCR catalyst for mobile application is the performance consistency of the catalyst. For example, it is desirable for a fresh catalyst to produce a similar level of $NO_x$ conversion to the same catalyst after it has aged.

Accordingly, there remains a need for SCR catalysts that offer improved performance over existing SCR materials.

SUMMARY OF THE INVENTION

According to embodiments of the present invention, a method of preparing a catalyst composition may comprise: exchanging a rare earth element into a molecular sieve; and incorporating a promoter metal into the molecular sieve; wherein the rare earth element exchanging step and the promoter metal incorporation step are performed as separate steps.

In some embodiments, the rare earth element is exchanged into the molecular sieve before incorporating the promoter metal. In some embodiments, the promoter metal is incorporated into the molecular sieve before exchanging the rare earth element.

The rare earth element may comprise, for example, cerium. The promoter metal may comprise, for example, copper. In embodiments where the promoter metal comprises copper, the catalyst composition may comprise an atomic Cu:Al of 0.2 to 0.45. In some embodiments, a catalyst composition of the present invention comprises minimal surface $CeO_2$. In some embodiments, the molecular sieve has a SAR of about 10 to about 25. In some embodiments, the molecular sieve may have a CHA framework.

In some embodiments, catalyst composition comprises the rare earth element in an amount of about 0.5 to about 5 wt % of the catalyst composition. In some embodiments, the catalyst composition comprises the promoter metal in an amount of about 0.5 to about 6 wt % of the catalyst composition.

According to certain embodiments, a method of preparing a catalyst composition comprises: first, incorporating cerium into a molecular sieve having a CHA framework though ion exchange to prepare a cerium-exchanged CHA molecular sieve; second, incorporating copper into the cerium-exchanged CHA to prepare a cerium-exchanged, copper-promoted CHA molecular sieve.

According to some aspects of the present invention, a catalyst composition comprises a rare earth element-exchanged, metal-promoted molecular sieve. Such catalyst composition may comprise minimal surface rare earth element—promoter metal species.

In some embodiments, the molecular sieve comprises a small pore molecular sieve, such as a CHA framework.

DETAILED DESCRIPTION OF PREFERRED EMBODIMENTS OF THE INVENTION

Figure 1:
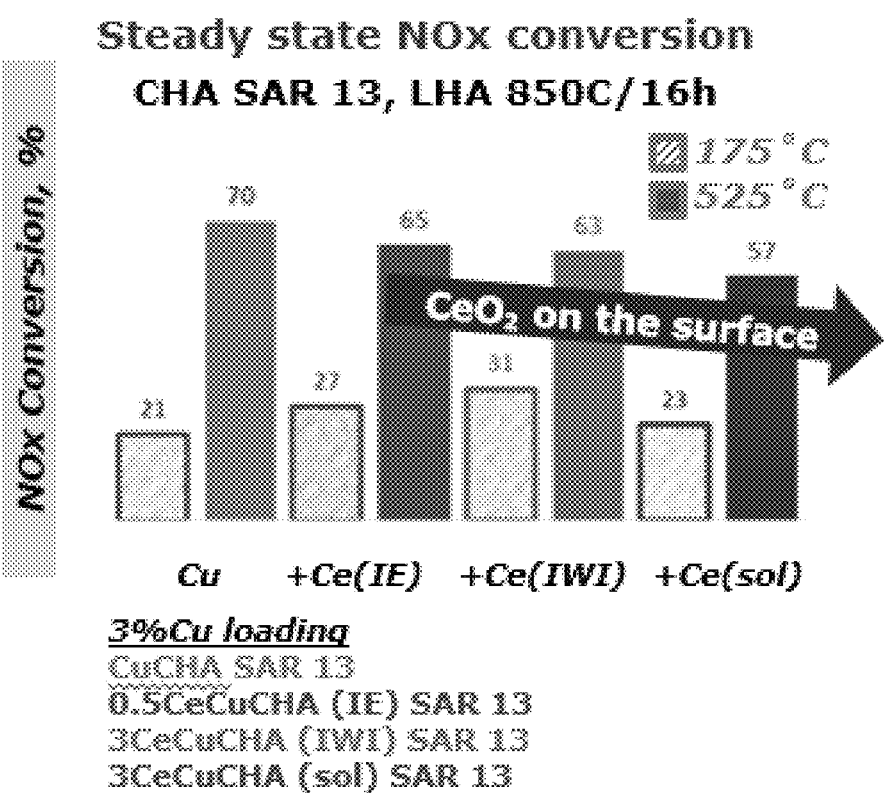
FIG. 1 shows performance of catalysts prepared by various techniques.

Compositions and methods of the invention are directed to a catalyst for improving exhaust gas emissions generated by diesel and other lean burn engines least in part, by reducing $NO_x$ and/or $NH_3$ slip concentrations lean burn exhaust gas over a broad operational temperature range. Useful catalyst compositions are those that selectively reduce $NO_x$ and/or oxidize ammonia in an oxidative environment (i.e., an SCR catalyst and/or AMOX catalyst). Preferred catalyst compositions include a metal-promoted molecular sieve with a rare earth element. It has surprisingly been found that exchanging a rare earth element in the molecular sieve and separately incorporating the promoter metal produces a catalyst composition with superior low temperature activity and selectivity after hydrothermal aging as compared to catalyst compositions with the same components but prepared in a different manner. Therefore, methods of preparing a catalyst composition include incorporating a rare earth element to the exchange sites of a molecular sieve, and incorporating a promoter metal through a separate process, either before or after the rare earth element incorporation.

Without wishing to be bound by theory, it is believed that the benefits demonstrated by catalyst compositions of the present invention may be related to the minimal formation of surface rare earth element—promoter metal species. Minimizing the formation of these undesired species may be achieved by limiting the interaction of the promoter metal and the rare earth element during preparation. According to some aspects of the present invention, preparation methods may result in lower amounts of surface rare earth element—promoter metal species by first incorporating the rare earth element into the exchange sites of the molecular sieve and washing surface adsorbed species before calcining, and then incorporating the promoter metal, thus minimizing the presence of rare earth element ions and promoter metal ions together. According to another aspect of the present invention, preparation methods may result in lower amounts of surface rare earth element—promoter metal species by first incorporating the promoter metal and washing surface adsorbed species before calcining, and then incorporating the rare earth element, thus minimizing the presence of rare earth element ions and promoter metal ions together.

In a particular embodiment, a catalyst composition comprises a cerium exchanged, copper promoted aluminosilicate having a CHA framework with an SAR of about 10 to about 25, about 17 to about 23, or about 10 to about 15, and wherein the copper is present in a copper-to-aluminum ratio of about 0.2 to about 0.45, and wherein Ce is present in an amount of about 0.5 wt % to about 5 wt % of the catalyst composition. In some aspects, such a catalyst composition may be prepared by first adding cerium to the CHA by ion exchange, then adding copper.

Molecular Sieve

Catalyst compositions of embodiments of the present invention include a molecular sieve. In some embodiments, the molecular sieve comprises, or consists essentially of, a molecular sieve having an aluminosilicate framework (e.g. zeolite) or a silicoaluminophosphate framework (e.g. SAPO). In some embodiments, the molecular sieve comprises, or consists essentially of, a molecular sieve having an aluminosilicate framework (e.g. zeolite). In some embodiments, preferred zeolites are synthetic zeolites.

When the molecular sieve has an aluminosilicate framework (e.g. the molecular sieve is a zeolite), then typically the molecular sieve has a silica to alumina molar ratio (SAR) of from 5 to 200 (e.g. 10 to 200); 10 to 100 (e.g. 10 to 30 or 20 to 80); 10 to 50; 10 to 30; 12 to 40; 15 to 30; 5 to 20; 5 to 15; 8 to 15; 8 to 13; 10 to 15; 10 to 20; 10 to 40; 10 to 60; 10 to 80; 10 to 100; 10 to 150; <30; <20; <15; or <13. In some embodiments, a suitable molecular sieve has a SAR of >200; >600; or >1200. In some embodiments, the molecular sieve has a SAR of from about 1500 to about 2100.

The molecular sieve may be a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC)

selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or combination and/or an intergrowth of two or more thereof. In some embodiments, the small pore molecular sieve has a framework structure selected from the group consisting of CHA, LEV, AEI, AFX, ERI, LTA, SFW, KFI, DDR and ITE. In some embodiments, the small pore molecular sieve has a framework structure selected from the group consisting of CHA and AEI. The small pore molecular sieve may have a CHA framework structure.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI and WEN, or a mixture and/or an intergrowth of two or more thereof. In some embodiments, the medium pore molecular sieve has a framework structure selected from the group consisting of FER, MEL, MFI, and STT. In some embodiments, the medium pore molecular sieve has a framework structure selected from the group consisting of FER and MFI, particularly MFI. When the medium pore molecular sieve is a zeolite and has a FER or MFI framework, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. In some embodiments, the large pore molecular sieve has a framework structure selected from the group consisting of AFI, BEA, MAZ, MOR, and OFF. In some embodiments, the large pore molecular sieve has a framework structure selected from the group consisting of BEA, MOR and FAU. When the large pore molecular sieve is a zeolite and has a framework structure of FTC BEA, FAU or MOR, then the zeolite may be a beta zeolite, faujasite, zeolite Y, zeolite X or mordenite.

In some embodiments, a suitable molecular sieve includes a combination of small and large pore frameworks. In some embodiments, a suitable molecular sieve includes ZSM-34 (ERI+OFF).

Preferred molecular sieves have a molar silica to alumina ratio (SAR) of less than about 30, more preferably about 5 to about 30, for example about 10 to about 25, from about 10 to 15, from about 15 to about 25, from about 17 to about 23, from about 14 to about 20, and from about 15 to about 17. The silica-to-alumina ratio of zeolites may be determined by conventional analysis. This ratio is meant to represent, as closely as possible, the ratio in the rigid atomic framework of the zeolite crystal and to exclude silicon or aluminum in the binder or in cationic or other form within the channels. Since it may be difficult to directly measure the silica to alumina ratio of zeolite after it has been combined with a binder material, particularly an alumina binder, these silica-to-alumina ratios are expressed in terms of the SAR of the zeolite per se, i.e., prior to the combination of the zeolite with the other catalyst components.

In certain embodiments, the molecular sieve comprises, consists essentially of, or consists of a disordered framework selected from the group consisting of ABC-6, AEI/CHA, AEI/SAV, AEN/UEI, AFS/BPH, BEC/ISV, beta, fuajasite, ITE/RTH, KFI/SAV, lovdarite, montesommaite, MTT/TON, pentasils, SBS/SBT, SSF/STF, SSZ-33, and ZSM-48. In a preferred embodiment, one or more of the small pore molecular sieves may comprise a CHA Framework Type Code selected from SAPO-34, AlPO-34, SAPO-47, ZYT-6, CAL-1, SAPO-40, SSZ-62 or SSZ-13 and/or an AEI Framework Type Code of selected from AlPO-18, SAPO-18, SIZ-8, or SSZ-39. In one embodiment, the mixed phase composition is an AEI/CHA-mixed phase composition. The ratio of each framework type in the molecular sieve is not particularly limited. For example, the ratio of AEI/CHA may range from about 5/95 to about 95/5, preferably about 60/40 to 40/60. In an exemplary embodiment, the ratio of AEI/CHA may range from about 5/95 to about 40/60.

Rare Earth

Catalyst compositions of the present invention contain one or more rare earth elements which are incorporated into the molecular sieve such that they are present as counterions at the ion exchange sites of the framework structure. The rare earth element may be present as an extra-framework element, which is one that resides within the molecular sieve and/or on at least a portion of the molecular sieve surface, does not include aluminum, and does not include atoms constituting the framework of the molecular sieve. The rare earth element can be added to the molecular sieve via any known technique such as ion exchange, impregnation, isomorphous substitution, etc. Preferably the rare earth element is incorporated through ion exchange. Preferably, the one or more rare earth elements are selected from the group consisting of La, Ce, Pr, Nd, Sm, Eu, Gd, Tb, Dy, Ho, Er, Tm, Yb, Lu, Y, and Sc, including combinations of two or more thereof. In a particular embodiment, a preferred rare earth element comprises Ce.

A method of preparing a catalyst composition may include incorporating a rare earth element into a molecular sieve through ion exchange. The ion exchange may be conducted by blending the molecular sieve into a solution containing soluble precursors of the rare earth element(s). The pH of the solution may be adjusted to induce precipitation of the catalytically active rare earth element cations onto or within the molecular sieve structure. For example, in a preferred embodiment a chabazite is immersed in a solution containing cerium acetate for a time sufficient to allow incorporation of the catalytically active cerium cations into the molecular sieve structure by ion exchange. Unexchanged cerium ions are precipitated out. Depending on the application, a portion of the unexchanged ions can remain in the molecular sieve material as free cerium. The cerium-substituted molecular sieve may then be washed, dried and calcined.

Generally, ion exchange of the cerium cation into or on the molecular sieve may be carried out at room temperature or at a temperature up to about 80° C. over a period of about 1 to 24 hours at a pH of about 7. The resulting catalytic molecular sieve material is preferably dried at about 100 to 120° overnight and calcined at a temperature of at least about 550° C.

The rare earth element content of the catalyst composition by weight preferably comprises from about 0.5 to about 15 wt %; about 0.5 to about 10 wt %; about 0.5 to about 5 wt %, based on the weight of the catalyst composition. These ranges are particularly preferred for cerium exchanged, copper promoted aluminosilicates having a CHA framework with an SAR of about 10 to about 25, about 17 to about 23, or about 10 to about 15, and more preferably for such embodiments, wherein the copper is present in a copper-to-aluminum ratio of about 0.2 to about 0.45.

Promoter Metal

Catalyst compositions of the present invention comprise, in addition to one or more rare earth elements, at least one promoter metal to improve the catalytic performance and/or thermal stability of the material. Such promoter metal may be added to the molecular sieve separately from the incorporation of the rare earth metal, as it has surprisingly been found that the addition of the promoter metal in a separate process from the addition of the rare earth element produces a catalyst with superior low temperature activity and selectivity after hydrothermal aging as compared to catalysts with the same components but prepared in a different manner. Therefore, methods of preparing a catalyst composition may include incorporating a rare earth element such as through ion exchange and incorporating a promoter metal in a separate process, either before or after incorporation of the rare earth element.

The promoter metal may be present as an extra-framework metal, which is one that resides within the molecular sieve and/or on at least a portion of the molecular sieve surface, does not include aluminum, and does not include atoms constituting the framework of the molecular sieve. The promoter metal can be added to the molecular sieve via any known technique such as ion exchange, impregnation, isomorphous substitution, etc. The promoter metal may be present as counter-ions at the ion exchange sites of the framework structure.

Promoter metals may be of any of the recognized catalytically active metals that are used in the catalyst industry to form metal-exchanged molecular sieves. In one embodiment, at least one promoter metal is used in conjunction with the molecular sieve to increase the catalyst's performance. Preferred promoter metals are selected from the group consisting of copper, nickel, zinc, iron, tin, tungsten, molybdenum, cobalt, bismuth, titanium, zirconium, antimony, manganese, chromium, vanadium, niobium, ruthenium, rhodium, palladium, gold, silver, indium, platinum, iridium, rhenium, and mixtures thereof. More preferred promoter metals include those selected from the group consisting of chromium, manganese, iron, cobalt, nickel, and copper, and mixtures thereof. Preferably, at least one of the promoter metals is copper.

In certain embodiments, the promoter metal loading is about 0.1 to about 10 wt % based on the total weight of the catalyst composition, for example from about 0.5 wt % to about 6 wt %, and from about 3 to about 6 wt %. In certain embodiments, the promoter metal (M), preferably copper, is present in the molecular sieve in an amount to produce a M:Al atomic ratio of about 0.2 to about 0.45.

Catalyst Article

The catalyst composition can be in the form of a washcoat, preferably a washcoat that is suitable for coating a substrate, such as a metal or ceramic flow through monolith substrate or a filtering substrate, including for example a wall-flow filter or sintered metal or partial filter. Accordingly, another aspect of the invention is a washcoat comprising a catalyst composition as described herein. In addition to the catalyst composition, washcoat compositions can further comprise one or more binders selected from the group consisting of alumina, silica, (non zeolite) silica-alumina, naturally occurring clays, $TiO_2$, $ZrO_2$, and $SnO_2$. A further aspect of the invention is a catalyst article comprising a substrate and a catalyst composition as described herein, which may be applied as a washcoat.

Preferred substrates for use in mobile application are monoliths having a so-called honeycomb geometry which comprises a plurality of adjacent, parallel channels, each channel typically having a square cross-sectional area. The honeycomb shape provides a large catalytic surface with minimal overall size and pressure drop. The catalyst composition can be deposited on a flow-through monolith substrate (e.g., a honeycomb monolithic catalyst support structure with many small, parallel channels running axially through the entire part) or filter monolith substrate such as a wall-flow filter, etc. In another embodiment, the catalyst composition is formed into an extruded-type catalyst. Preferably, the catalyst composition is coated on a substrate in an amount sufficient to reduce the $NO_x$ contained in an exhaust gas stream flowing through the substrate. In certain embodiments, at least a portion of the substrate may also contain a platinum group metal, such as platinum (Pt), to oxidize ammonia in the exhaust gas stream or perform other functions such as conversion of CO into $CO_2$.

Methods of Use and Systems

The catalyst compositions described herein can promote the reaction of a reductant, preferably ammonia, with nitrogen oxides to selectively form elemental nitrogen ($N_2$) and water ($H_2O$) vis-à-vis the competing reaction of oxygen and ammonia. In one embodiment, the catalyst composition can be formulated to favor the reduction of nitrogen oxides with ammonia (i.e., and SCR catalyst). In another embodiment, the catalyst can be formulated to favor the oxidation of ammonia with oxygen (i.e., an ammonia oxidation (AMOX) catalyst). In yet another embodiment, an SCR catalyst and an AMOX catalyst are used in series, wherein both catalyst compositions comprise the metal containing molecular sieve described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst or a non-PGM catalyst. Preferably, the AMOX catalyst is disposed on a high surface area support, including but not limited to alumina. In certain embodiments, the AMOX catalyst is applied to a substrate, preferably substrates that are designed to provide large contact surface with minimal backpressure, such as flow-through metallic or cordierite honeycombs. For example, a preferred substrate has between about 25 and about 300 cells per square inch (CPSI) to ensure low backpressure. Achieving low backpressure is particularly important to minimize the AMOX catalyst's effect on the low-pressure EGR performance. The AMOX catalyst can be applied to the substrate as a washcoat, preferably to achieve a loading of about 0.3 to 2.3 g/in³. To provide further $NO_x$ conversion, the front part of the substrate can be coated with just SCR coating, and the rear coated with SCR and an $NH_3$ oxidation catalyst which can further include Pt or Pt/Pd on an alumina support.

The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea ($(NH_2)_2CO$), ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred.

In another embodiment, all or at least a portion of the nitrogen-based reductant, particularly $NH_3$, can be supplied by a $NO_x$ adsorber catalyst (NAC), a lean $NO_x$ trap (LNT), or a $NO_x$ storage/reduction catalyst (NSRC), disposed upstream of the dual function catalytic filter. One of the functions of the NAC in the present invention is to provide a source of $NH_3$ for the downstream SCR reaction. Accordingly, the NAC is configured in the system in a manner similar to that of the injector—i.e., upstream of the dual function catalytic filter and preferably with no intervening SCR or other catalytic components between the NAC and the filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as 20 to 60 $g/ft^3$. Alternatively, the precious metal of the catalyst is characterized by the average concentration which may be from about 40 to about 100 grams/$ft^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

According to another aspect of the invention, provided is a method for the reduction of NOx compounds or oxidation of $NH_3$ in a gas, which comprises contacting the gas with a catalyst composition described herein for the catalytic reduction of $NO_x$ compounds for a time sufficient to reduce the level of $NO_x$ compounds in the gas. In one embodiment, nitrogen oxides are reduced with the reducing agent at a temperature of at least 100° C. In another embodiment, the nitrogen oxides are reduced with the reducing agent at a temperature from about 150° C. to 750° C. In a particular embodiment, the temperature range is from 175 to 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the catalyst composition for use in the present invention is located downstream of the filter. In other embodiments, the SCR catalyst composition is incorporated on a filter substrate. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the $NO_x$ concentration in the exhaust gas; and (f) contacting the exhaust gas with an AMOX catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, a catalyst composition described herein. The system can include means, when in use, for controlling the metering means so that nitrogenous reductant is metered into the flowing exhaust gas only when it is determined that the catalyst composition is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3$/NO and 4:3 $NH_3$/$NO_2$. The control means can comprise a pre-programmed processor such as an electronic control unit (ECU).

In a further embodiment, an oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR catalyst composition having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the catalyst composition. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the catalyst composition. Alternatively, if the filter is uncatalyzed, the means for metering nitrogenous reductant can be located between the oxidation catalyst and the filter.

In a further embodiment, the catalyst composition for use in the present invention is coated on a filter located downstream of the oxidation catalyst. Where the filter includes the catalyst composition for use in the present invention, the point of metering the nitrogenous reductant is preferably located between the oxidation catalyst and the filter.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

Example

CuCHA SAR 13 and CuCHA SAR 19: CuCHA catalysts have been prepared by impregnating the zeolite powder with a Cu(II) Acetate solution to achieve Cu loadings of 2 wt % and 3 wt %. The obtained powders have been dried at 105° C. for 3 h and then calcined at 500° C. for 2 h.

Ce was added to the CuCHA catalysts by 3 different methods:

By incipient wetness impregnation: using a Ce (III) Acetate solution to achieve Ce loadings between 0.5 and 3% wt. The powders were dried at 105° C. for 3 h before calcination at 500° C. for 2 h.

By wet ion exchange: the CuCHA SAR 13 catalyst was mixed with a Ce (III) Acetate monohydrate aqueous solution to achieve Ce loading ~0.5% wt. The slurry was stirred at 80° C. for 4 h at and then filtered. The powder obtained was washed and dried before calcination at 500° C./2 h.

By deposition: $CeO_2$ via a sol method in which colloidal $CeO_2$ was mixed with the CuCHA catalyst to achieve 3% wt Ce loading. The sol was then filtered, dried, and calcined at 500° C. for 2 h.

FIG. 1 shows $NO_x$ conversion at 175° C. and 525° C. for each of the CHA SAR 13 reference catalysts after LHA 850° C. for 16 hours. The results demonstrate that including more exchanged Ce provides better low temperature conversion, while the presence of more $CeO_2$ on the surface negatively affects high temperature conversion.

Figure 2:
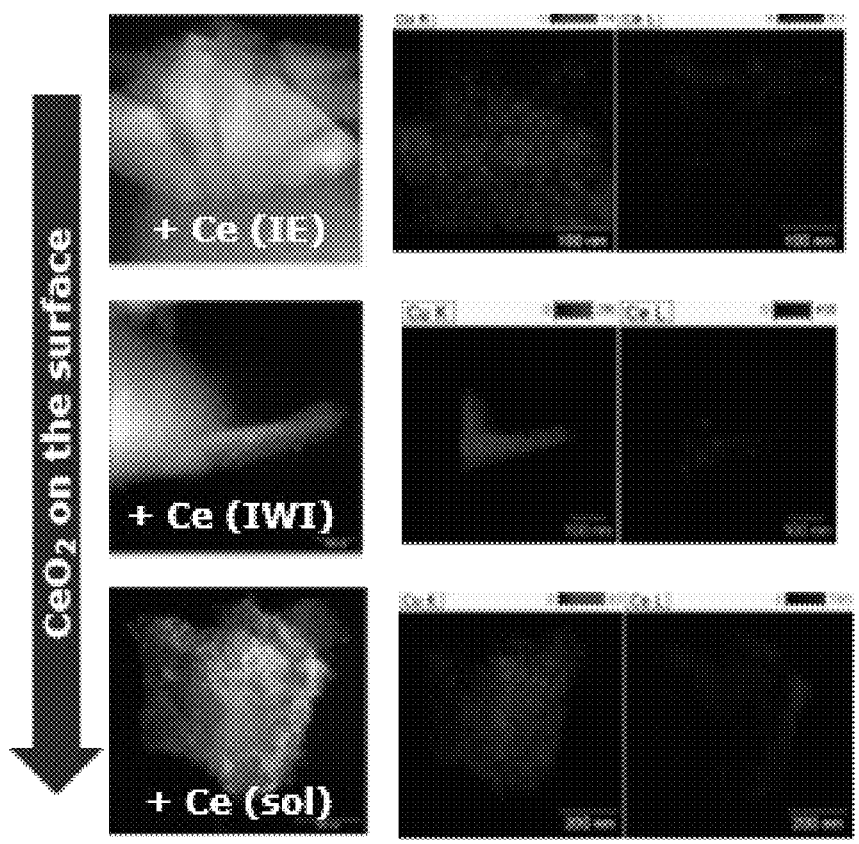
FIG. 2 shows $CeO_2$ on the surface of the prepared catalysts.

FIG. 2 shows $CeO_2$ on the surface of the prepared catalysts.

Figure 3:
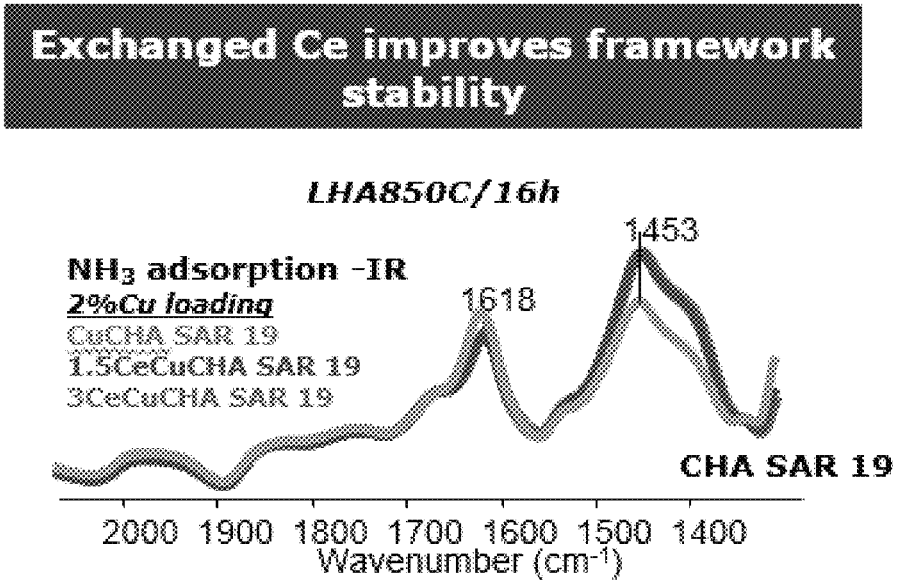
FIG. 3 shows the effect of exchanged Ce on framework stability.

FIG. 3 shows that exchanged Ce improves framework stability.

The invention claimed is:

1. A method of preparing a catalyst composition comprising:
   a. exchanging a rare earth element into a molecular sieve;
   b. incorporating a promoter metal into the molecular sieve;
   wherein the rare earth element exchanging step and the promoter metal incorporation step are performed as separate steps,
   wherein the promoter metal comprises copper and the catalyst composition comprises an atomic Cu:Al of 0.2 to 0.45,
   wherein the molecular sieve comprises CHA with a silica to alumina ratio (SAR) of 17 to about 23, and
   wherein the catalyst composition comprises the rare earth element in an amount of about 0.5 to about 5 wt % of the catalyst composition.

2. The method claim 1, wherein the rare earth element is exchanged into the molecular sieve before incorporating the promoter metal.

3. The method of claim 1, wherein the promoter metal is incorporated into the molecular sieve before exchanging the rare earth element.

4. The method of claim 1, wherein the rare earth element is exchanged into the molecular sieve by ion exchange.

5. The method of claim 1, wherein the promoter metal is incorporated into the molecular sieve by ion exchange.

6. The method of claim 1, wherein the catalyst composition comprises minimal surface $CeO_2$.

7. The method of claim 1, wherein the rare earth element comprises cerium.

8. The method of claim 1, wherein the promoter metal comprises copper.

9. The method of claim 1, wherein catalyst composition comprises the promoter metal in an amount of about 0.5 to about 6 wt % of the catalyst composition.

10. A catalyst composition prepared by the method of claim 1.

11. A catalyst composition prepared according to the method of claim 1.

12. The catalyst composition of claim 11, wherein the molecular sieve comprises a small pore molecular sieve.

13. The catalyst composition of claim 11, comprising the rare earth element in an amount of about 0.5 to about 5 wt % of the catalyst composition.

14. The catalyst composition of claim 11, comprising the promoter metal in an amount of about 0.5 to about 6 wt % of the catalyst composition.

15. The catalyst composition of claim 11, comprising minimal surface $CeO_2$.

* * * * *